Figure 1:
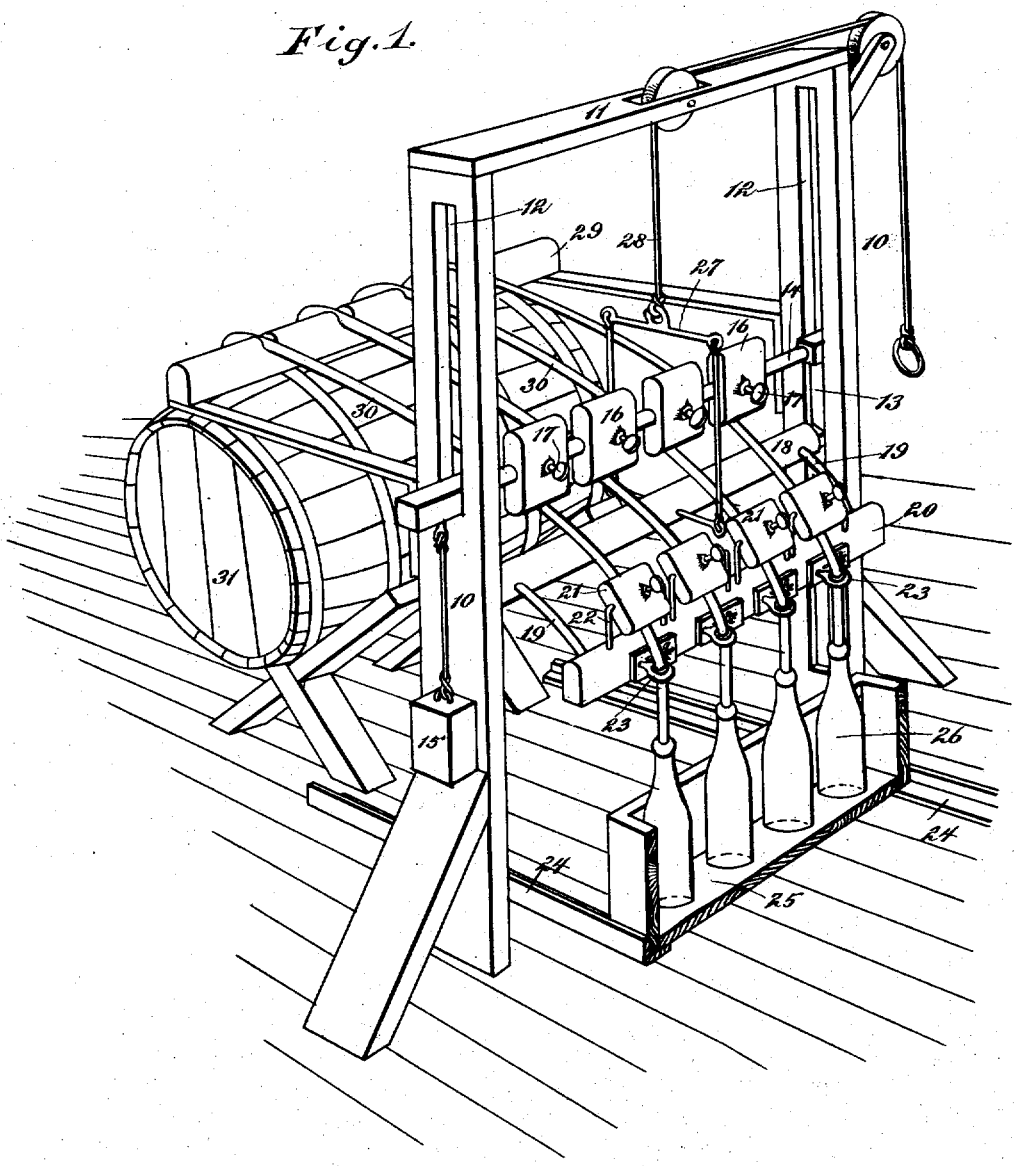

2 Sheets—Sheet 1.

A. M. DONALLY.

BOTTLE FILLING APPARATUS.

No. 11,300. Reissued Jan. 17, 1893.

WITNESSES:
W. M. Twitchell
C. Sedgwick

INVENTOR
A. M. Donally
BY Munn & Co
ATTORNEYS.

THE NORRIS PETERS CO., PHOTO-LITHO., WASHINGTON, D. C.

A. M. DONALLY.
BOTTLE FILLING APPARATUS.
No. 11,300. Reissued Jan. 17, 1893.
Fig. 2.
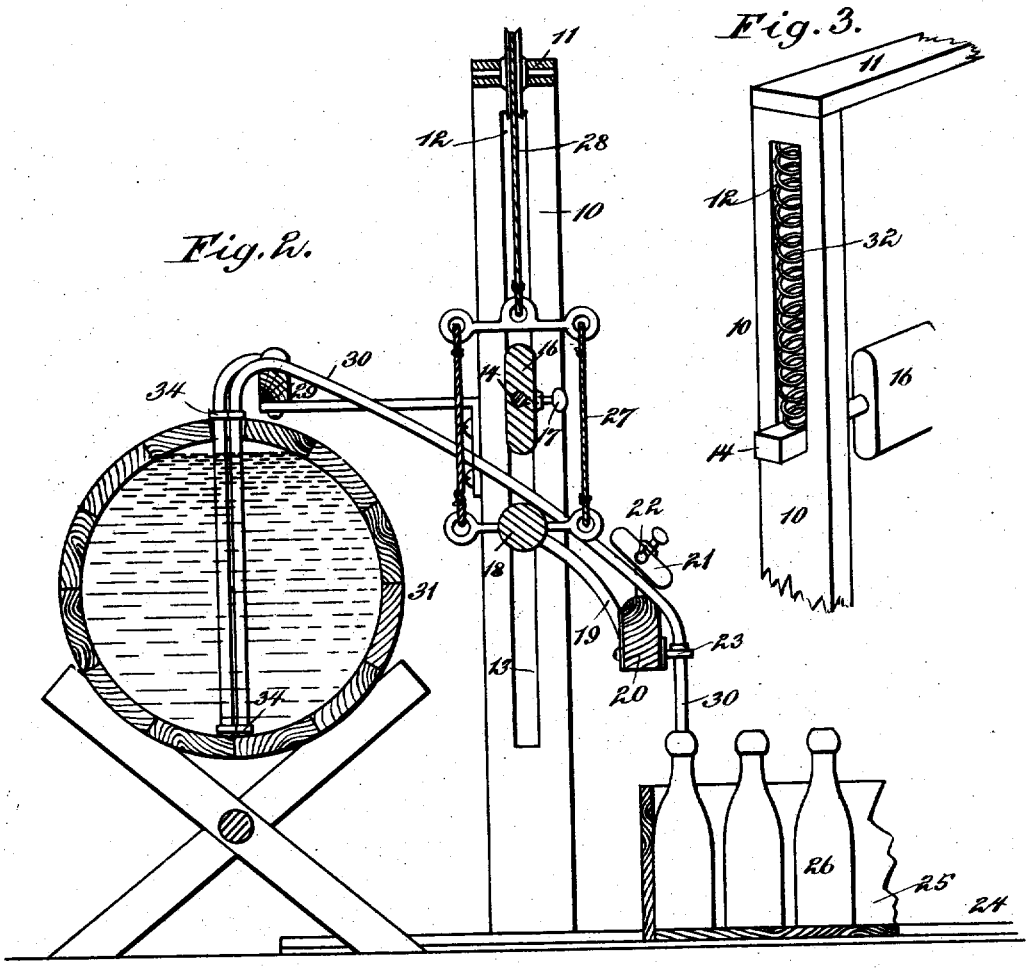
Fig. 3.
Fig. 4.
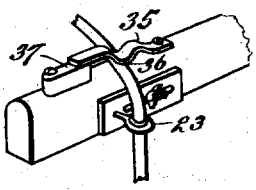
Fig. 5.
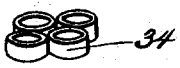
WITNESSES:
W. M. Twitchell.
C. Sedgwick
INVENTOR
A. M. Donally
BY Munn & Co
ATTORNEYS.
THE NORRIS PETERS CO., PHOTO-LITHO., WASHINGTON, D. C.

UNITED STATES PATENT OFFICE.

AMALIA M. DONALLY, OF NEW YORK, N. Y., ASSIGNOR, BY MESNE ASSIGNMENTS, TO THE DONALLY MANUFACTURING COMPANY.

BOTTLE-FILLING APPARATUS.

SPECIFICATION forming part of Reissued Letters Patent No. 11,300, dated January 17, 1893.

Original No. 445,882, dated February 3, 1891. Application for reissue filed August 10, 1891. Serial No. 402,320.

*To all whom it may concern:*

Be it known that I, AMALIA M. DONALLY, of New York city, in the county and State of New York, have invented a new and Improved Bottle-Filling Apparatus, of which the following is a full, clear, and exact description.

My invention relates to an improved bottle-filling apparatus, and has for its object to provide a device of simple, durable and economic construction whereby bottles may be conveniently and expeditiously filled with liquid drawn from any convenient storage tank, keg, barrel, or like receptacle, and to so extract the liquid from the receptacle and convey the same into bottles that the liquid will be prevented from foaming; and a further object of the invention is to employ in connection with a suitable apparatus flexible filling tubes.

The invention consists in the novel construction and combination of the several parts, as will be hereinafter fully set forth and pointed out in the claims.

Reference is to be had to the accompanying drawings forming a part of this specification, in which similar figures of reference indicate corresponding parts in all the views.

Figure 1 is a perspective view of the complete apparatus, illustrated in operative position; Fig. 2 is a central vertical section through the apparatus; Fig. 3 is a detail perspective view of a slight modification; Fig. 4 is a perspective view of a further modification of construction; and Fig. 5 is a perspective view of the guide rings for the hose or pipes detached.

The frame of the machine consists preferably of two uprights 10, suitably braced at their lower ends and connected at their tops by a cross bar 11. Each upright is provided with a longitudinal slot 12, extending from a point near the center nearly to the upper end, and with a longitudinal groove 13 upon the inner face, leading upward into the slot.

In the slots 12 of the standards the ends of a bar 14, are held to slide. The said bar is circular throughout the major portion of its length. The ends however, are made to conform in shape to the cross sectional contour of the slots in which they slide. The extremities of the bar 14, extend beyond the standards 10, and have secured thereto or thereon a weight 15, whereby the ends of the bar 14, are normally made to rest upon the lower end portion of the slots 12. Upon the circular portion of the bar 14 a number of buttons 16, are secured, preferably by means of set screws 17, the buttons being capable of turning upon the rod, and being retained in proper position thereon by the manipulation of said set screws.

In the grooves 13 of the standards the extremities of a second or anvil bar 18, are held to slide. The bar 18, is also preferably circular throughout its length, but the extremities entering the grooves are polygonal. Between the standards 10, from the ends of the lower cross bar 18, downwardly and outwardly curved arms 19, are projected, the said arms being connected in any suitable or approved manner at their lower ends with a horizontal guide or supporting bar or beam 20. The guide or supporting bar or beam is preferably provided with buttons 21, corresponding in number, location and character to the upper buttons 16, the lower buttons 21, being preferably held to turn upon staples 22, attached to the said guide or supporting bar or beam. The lower buttons are held in the desired position also by means of set screws.

Upon the outer side face of the supporting or guide bar 20 a number of eyes 23, or equivalent devices, are secured, the said eyes being capable of lateral adjustment, and one of the eyes is arranged beneath each of the buttons 21.

Beneath the standards 10 of the frame, upon the floor or other support, tracks 24, are laid, and a box 25, or other equivalent receptacle is held to slide upon said tracks, which box is adapted to contain bottles 26, or other vessels to be filled and arranged in rows as illustrated.

The bar 18, is adapted to be elevated by the operator, and this may be accomplished in any suitable or approved manner. As illustrated a yoke 27, is attached to the center of the bar, and a rope or chain 28, is secured to the upper portion of the yoke and passed over a pulley in the cross bar of the frame and down at one side thereof, but it is evident that a lever may be substituted if in practice it is found desirable. A horizontal supporting frame 29, is also preferably attached to the rear of the main frame, provided with a series of notches to receive conducting tubes 30. The conducting tubes 30, may be constructed of any suitable or approved flexible material, preferably rubber, and the said tubes are adapted to be connected at their rear ends with a cask 31, or other receptacle, from which the liquid is to be drawn. The tubes pass from the cask over the supporting frame 29, beneath the upper buttons 16, between said buttons and the lower sliding bar 18, and thence downward beneath the lower buttons 21 and through the eyes 23, the lower ends of the tube being adapted to enter the mouths of the bottles or other vessels to be filled. Where the tubes pass through the eyes 23 a washer is ordinarily attached, so that when the bar 18 is elevated the lower ends of the tubes will be raised also.

If in practice it is found desirable the weights 15, connected with the upper bar 14, may be substituted by springs 32, as shown in Fig. 3, in which event the springs are located in the slots 12 of the standards, the lower ends of the springs bearing upon the upper surface of the bar and the upper ends against the upper wall of the slots.

The tubes may enter the cask 31, in any suitable or approved manner; that is to say, the liquid may be drawn or siphoned from the bung-hole in the top of the cask. When the tubes are passed down through the bung-hole in the top of the barrel, a number of rings 34, corresponding to the number of tubes, are soldered or otherwise attached to the tubes, the said rings being illustrated in Fig. 5. The tubes are passed through two sets of rings, as illustrated in Fig. 2, one set of rings being located at the ends of the tube introduced into the liquid, and the other set being located immediately above the mouth of the bung.

Instead of the lower buttons 21, the construction shown in Fig. 4 may be substituted, which construction consists of a spring 35, secured at one end to the supporting or guide-bar 20, the said spring being provided with a downwardly extending yoke projection 36, at or near its center; and the free end of the spring is made to rest upon a button 37, pivoted to the bar 20. The tubes are made to pass beneath the projection or extension 36 of the spring, and when the free end of the spring rests upon the button 37 the projection or extension 36 is held out of engagement with the tube. When the flow of liquid is to be stopped, by disengaging the button from the spring, the projection or extension of the spring exerts sufficient tension upon the tube to effectually prevent the liquid from flowing through the same. It will therefore be observed that the tubes must be flexible.

In the operation of the device as constructed in Fig. 1, by drawing down upon the rope 28 when the bottles have been filled the operator forces the lower bar 18 upward, and when the upper buttons 16, are in the vertical position the tubes are pinched or compressed between said buttons and the elevated bar in such manner as to stop the flow. The flow of liquid may be turned on to any particular tube by carrying the button 16 above the tube to a horizontal position; and the flow of liquid through any one tube may be stopped by compressing the tube between the supporting or guide bar 20 and the button immediately above it. When the bar 18, is elevated, the tubes are carried out of the mouths of the filled bottles or vessels, and the case or box 25 containing said vessels is pushed forward a sufficient distance to present another row of bottles or vessels to the tubes when the bar 18 is again lowered.

Having thus described my invention what I claim as new and desire to secure by Letters Patent is—

1. In a bottle filling apparatus, the combination with a flexible filling tube of a compressing device for compressing the tube to cut off the flow of the liquid, and mechanism for raising and lowering the compressing device, to lower and raise the tube in and out of the bottle, substantially as described.

2. In a bottle filling apparatus, the combination with flexible filling tubes, of a compression device arranged to simultaneously compress all the tubes, and means for releasing any one of the said tubes from compression independently of the others, substantially as described.

3. In a bottle filling apparatus, the combination with flexible filling tubes, of a compression device arranged to compress the tubes jointly or independently, and means for releasing all the tubes or any one of them from compression independently of the others, substantially as described.

4. The combination, with a shaft and compressing blocks carried by the shaft, of an anvil bar located beneath the blocks, and flexible tubes passed between the blocks and anvil bars, substantially as shown and described.

5. The combination, with a shaft and compressing blocks carried by the shaft, of an anvil bar located beneath the blocks, a guide bar supported from the anvil bar, and flexible tubes passed between the blocks and anvil bar and over the guide bar, substantially as shown and described.

6. In an apparatus of the character described, the combination, with a shaft, compressing blocks adjustable upon said shaft, and locking devices adapted to fasten the blocks to the shaft, of a movable anvil bar located beneath the block shaft, a guide bar supported by the anvil bar, adjustable guide devices attached to the guide bar, and flexible tubes engaging with the blocks, the anvil bar, the guide bar and guide devices, substantially as and for the purpose specified.

7. In a device of the character described, the combination, with a weighted shaft, compressing blocks adjustably secured to the said shaft, an anvil bar located beneath the compressing blocks, and a lifting device connected with the anvil bar, of a guide bar located in front of and below the anvil bar and connected therewith, guide devices attached to the guide bar at one side, compressing devices adjustably secured to the upper surface of the guide bar, and tubes passed between the compressing blocks and anvil bar between the guide bar and compressing devices and through the guide devices, substantially as described.

8. In a device of the character described, the combination with a shaft, compressing blocks adjustable upon the said shaft, an anvil bar located beneath the compressing blocks capable of movement to and from the same, and a lifting device connected with the anvil bar, of compressing devices adjustably supported above the guide bar, and tubes passed between the blocks and anvil bar and between the compressing devices and guide bar, as and for the purpose set forth.

AMALIA M. DONALLY.

Witnesses:

A. R. MANNING,

J. W. DEAN.